(12) United States Patent
Kanan et al.

(10) Patent No.: US 9,363,091 B2
(45) Date of Patent: Jun. 7, 2016

(54) POWER OVER ETHERNET DEVICES, SYSTEMS AND METHODS

(71) Applicant: Louroe Electronics, Van Nuys, CA (US)

(72) Inventors: Husam Lutfi Kanan, Van Nuys, CA (US); Philip Montinola Gayatin, Van Nuys, CA (US)

(73) Assignee: LOUROE ELECTRONICS, Van Nuys, CA (US)

( * ) Notice: Subject to any disclaimer, the term of this patent is extended or adjusted under 35 U.S.C. 154(b) by 324 days.

(21) Appl. No.: 14/139,770

(22) Filed: Dec. 23, 2013

(65) Prior Publication Data

US 2015/0177800 A1   Jun. 25, 2015

(51) Int. Cl.
*G06F 1/26* (2006.01)
*H04L 12/10* (2006.01)
*H04L 12/40* (2006.01)
*H04L 12/751* (2013.01)

(52) U.S. Cl.
CPC .......... *H04L 12/10* (2013.01); *H04L 12/40045* (2013.01); *H04L 45/02* (2013.01)

(58) Field of Classification Search
None
See application file for complete search history.

(56) References Cited

U.S. PATENT DOCUMENTS

| 7,921,308 | B2 | 4/2011 | Dhuyvetter et al. | |
|---|---|---|---|---|
| 8,013,466 | B1 | 9/2011 | Thompson et al. | |
| 8,132,027 | B2 | 3/2012 | Blaha et al. | |
| 2007/0081553 | A1* | 4/2007 | Cicchetti | H04L 12/10 370/466 |
| 2008/0028237 | A1* | 1/2008 | Knight | H04L 12/66 713/300 |
| 2009/0243391 | A1 | 10/2009 | Susong et al. | |
| 2012/0060042 | A1 | 3/2012 | Buhari et al. | |
| 2013/0073874 | A1 | 3/2013 | Eghbal | |

* cited by examiner

*Primary Examiner* — Paul Yanchus, III
(74) *Attorney, Agent, or Firm* — Foley & Lardner LLP

(57) ABSTRACT

An interface device is configured for interfacing one or more external devices to Ethernet Power Source Equipment PSE. The interface device includes a jack for connection to the PSE, and first and second output jacks. The first output jack provides an Ethernet power and data connection for an external device. The second output jack provides a DC power connection for an external device. A power extractor circuit provides a signature to the PSE, and provides a predefined output signal in response to receiving a power signal from the PSE. At least one delay element electrically connects the network connection jack and the first output jack, after a predefined delay from a time at which the power extractor circuit provides the output signal.

21 Claims, 3 Drawing Sheets

POWER OVER ETHERNET DEVICES, SYSTEMS AND METHODS

FIELD OF THE INVENTION

Embodiments of the present invention relate to electronic interface devices, systems and methods and, in particular embodiments, to electronic interface devices, systems and methods that provide a power and data interface between Ethernet Power Sourcing Equipment (PSE) and various types of electronic devices.

DETAILED DESCRIPTION

Embodiments of the present invention relate to interface devices, systems and methods configured to provide a versatile power and data interface between Ethernet PSE and various devices, including Powered Devices PDs (i.e., devices that are Power over Ethernet (PoE) compliant) and non-PoE compliant devices. A PoE compliant network device is a device that is configured to receive power and communicate (receive and/or transmit) data over an Ethernet connection. PDs include PoE compliant network devices and other network devices that are configured to obtain operating power from a network connection (such as a connection to a PSE).

Figure 1:
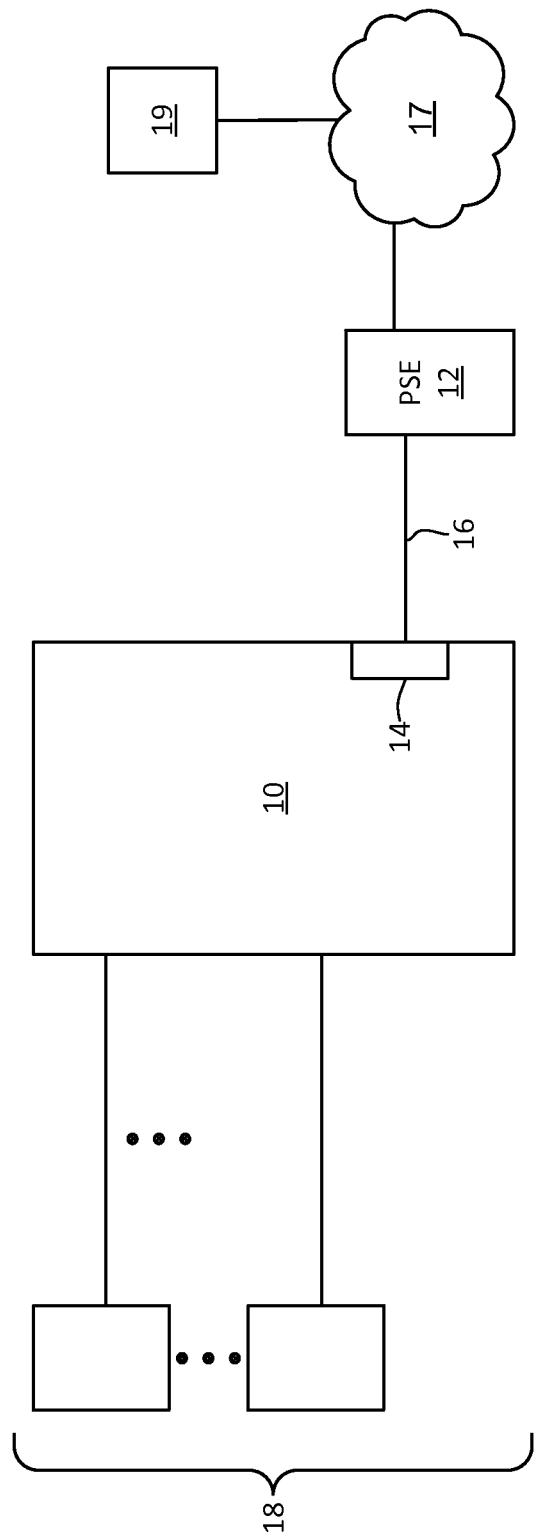
FIG. 1 is a schematic diagram of a system having an interface device according to an embodiment of the present invention, connected for communication on a network.

With reference to FIG. 1, an interface device 10, according to an embodiment of the present invention, connects to a PSE 12 through a single Ethernet connection jack 14 on the interface device 10 and a single connection cable 16. The interface device 10 includes other jacks for providing power and/or data connections to one or more devices 18, such as one or more PDs, non-PoE network devices and non-PoE devices. Thus, in particular embodiments, the interface device 10 provides a versatile electronic power and data interface to a PSE 12, for one or more of various types of electronic devices 18.

The interface device 10 is configured to extract power from the Ethernet connection and provide a power connection for powering one or more external non-PoE devices (non-Power-over-Ethernet devices that receive power from an external DC power source). The interface device 10 is also configured to pass through data and power to external PD (Power-over-Ethernet (PoE) compatible network devices), and to pass through data to external non-PoE network devices, such as, but not limited to cameras, microphones, speakers, encoders, or other suitable devices, for example, in accordance with the IEEE 802.3af.

When the interface device 10 is connected to a PSE 12, the interface device 10 provides a valid signature (for example, in accordance with IEEE 802.3af) to the PSE 12. As a result of this valid signature from the interface device 10, the PSE 12 provides PoE and data on the single cable connection 16 to the interface device 10 (for example, in accordance with the standards set forth by IEEE 802.3af). The interface device 10 is configured to perform or accomplish one or more of the following:

1. Detect, extract and transform power from the single port connection with the PSE to power the interface device 10 itself and other external (non-PoE) devices;
2. Pass-through data and power to a PD (PoE compatable) network device;
3. Pass through data to a non-PoE network device; and
4. Provide connectivity between a microphone or speakerphone and a network device possessing an audio input and audio output.

An interface device 10 according to an embodiment of the present invention includes electronics (hardware, software, programmed or programmable processors, or combinations thereof), that are configured to operate as described herein. In particular embodiments, the electronics of the interface device are contained in a single housing, for ease of installation. In other embodiments, the electronics of the interface device are contained in multiple housings, and are interconnected to operate as described herein. While examples of electronics are described herein, further embodiments of the present invention include other suitable electronic configurations for providing operations as described herein.

Figure 2:
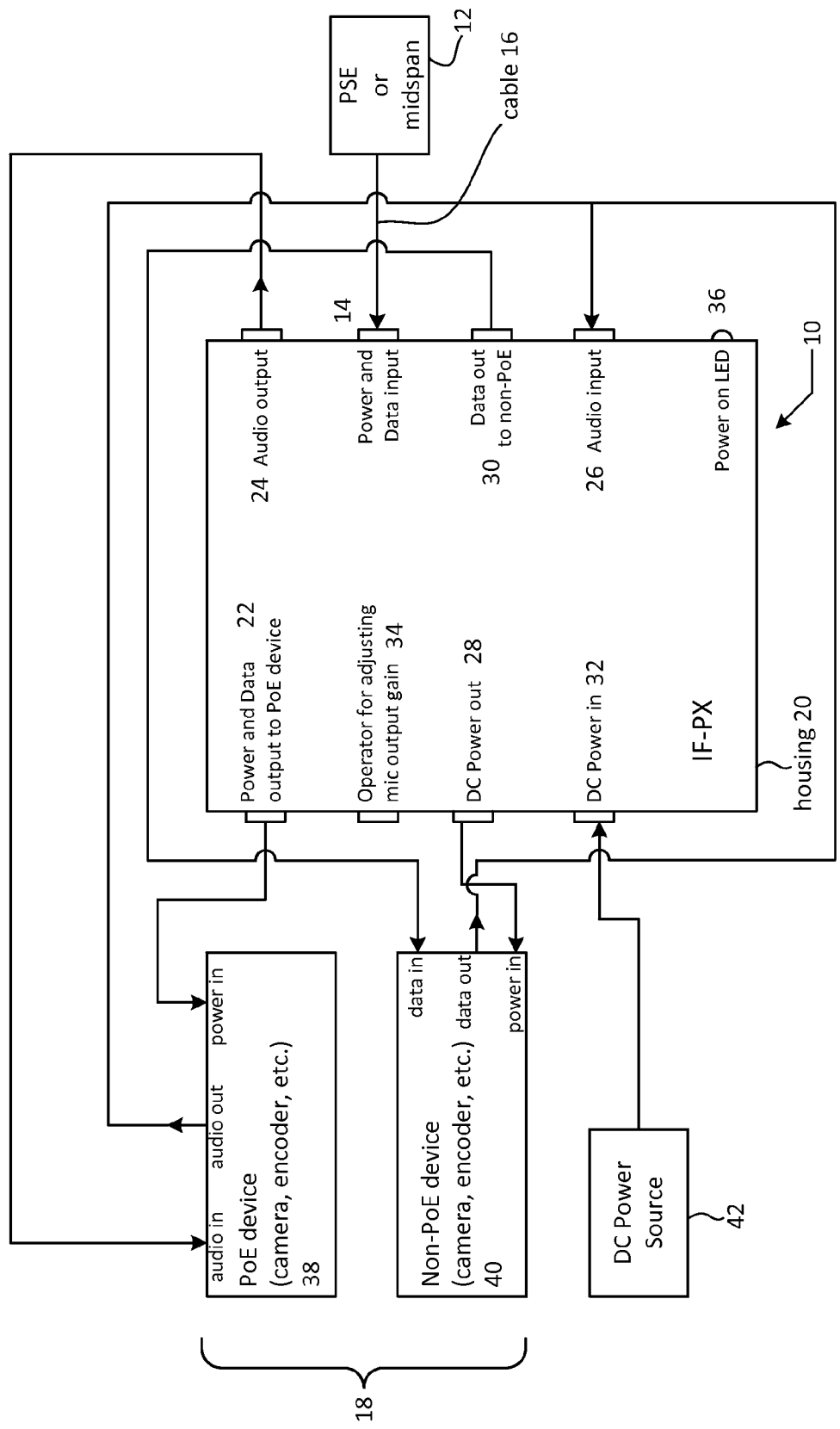
FIG. 2 is a schematic diagram of a system having an interface device according to an embodiment of the present invention.

An example of an interface device 10 according to an embodiment of the present invention is shown in FIG. 2. The interface device 10 includes electronics contained in a single housing structure 20. The electronics include a plurality of ports and, in particular embodiments, further include one or more manual controllers and/or one or more electronic indicators, each of which is supported by the housing structure 20 in a position to be accessible or viewable from outside of the housing structure 20. In the embodiment of FIG. 1, the interface device 10 includes seven ports 14 and 22-32, one manual controllers 34 and one electronic indicator 36, as described herein. In other embodiments, the interface device 10 includes other suitable numbers and arrangements of ports, manual controllers and/or indicators.

The interface device 10 connects to the PSE 12, through the single Ethernet port, via the jack 14. In particular embodiments the jack 14 comprises an RJ-45 jack or other suitable jack that is compliant with appropriate PoE standards. In other embodiments, the port 14 may be any other suitable jack, connector or electronic connection for connecting data and power from a PSE or other suitable network power and data source to the interface device 10. In particular embodiments, the interface device 10 connects to the PSE 12, through a single jack 14, via a single (multi-conductor) cable 16. In particular embodiments, the cable 16 comprises a conventional Ethernet connection cable having six conductors (such as, but not limited to, a pair of power and data conductors DC+/DC−, a first pair of data conductors RX+/RX−, and a second pair of data conductors TX+/TX−). In other embodiments, the interface device connects to a PSE or other suitable network data and power source equipment, via other suitable electronic connection cables.

The interface device 10 provides data and power connections to external devices or sources, through jacks 22-32. The jacks 22-32 comprise any suitable electrical connection jacks, connectors or other electrical connections, for connecting the interface device 10 to one or more PD and non-PoE compliant devices or other devices or sources as described herein. In particular embodiments, one or more (or all) of the jacks 22-32 are configured to receive and connect with conventional electronic connectors, such as, but not limited to audio or video plug connectors, or the like. Electronics within the interface device 10 are configured to extract power from the PSE 12 and, via one or more of the jacks 22-32, pass through power and data to one or more external PD devices and/or power to one or more external non-PoE devices (devices that normally obtain power from other sources, such as, but not limited to a 12V DC source).

In the example in FIG. 1, external devices 18 are connected to the interface device 10, through the jacks 22-30. The external devices 18 include a PoE device 38 and a non-PoE device 40.

In the illustrated embodiment, the PoE device 38 includes a power input terminal connected to a power a PoE power and data output jack 22 of the interface device. In embodiments in which the PoE device 38 is an audio device (or includes audio electronics), the PoE device 38 also includes an audio input terminal connected to an audio output jack 24 of the interface device 10, and an audio output terminal connected to an audio input jack 26 of the interface device 10. In example embodiments, the PoE device 38 is at least one of a power microphone, speaker, speaker/microphone, camera (still image or video), encoder, electronic sensor (for sensing any suitable parameter such as, but not limited to temperature, light, proximity, motion, moisture, humidity, smoke, or other predefined environmental condition), light, electronic display device, any combination thereof or the like.

The non-PoE device 40 in FIG. 2 includes a power input terminal connected to a DC power output jack 28. In embodiments in which the non-PoE device 40 is an audio device (or includes audio electronics), the non-PoE device 40 also includes a data input terminal (such as, but not limited to, an audio input terminal) connected to a data output jack 30 of the interface device 10, and a data output terminal (such as, but not limited to an audio data output terminal) connected to the data input jack 26 of the interface device 10. In example embodiments, the non-PoE device 40 is at least one of a power microphone, speaker, speaker/microphone, camera (still image or video), encoder, electronic sensor (for sensing any suitable parameter such as, but not limited to temperature, light, proximity, motion, moisture, humidity, smoke, or other predefined environmental condition), light, electronic display device, any combination thereof or the like.

The PSE 12 in FIGS. 1 and 2 may be any suitable network power and data source, that is connected to (or is part of) an electronic communication network 17. The communication network 17 may be any suitable network including, but not limited to the Internet, an Intranet, a local area network LAN, combinations thereof, or the like. One or more electronic processor devices or systems 19 (such as, but not limited to computers, servers, mobile phones, or other devices having communication and processing electronics) are connected for communication over the network 17. In particular embodiments, such processor devices or systems 19 are configured to communicate with one or more of external devices 18, through the interface device 10 and, in further embodiments, to communicate with processing electronics (not shown) in the interface device 10, itself. Thus, for example, processor devices or systems 19 may be configured to receive data (such as, but not limited to, audio data, video data, image data, sensor data, or the like) from one or more devices 18, to process and/or store such data. Alternatively or in addition, the processor devices or systems 19 may be configured to transmit control data (such as, but not limited to, ON or OFF control signals (to control a device 18 to turn on or off), camera direction aim control signals (to control and/or move the direction of a camera in the device 18), microphone gain control signals (to control the gain of one or more microphones in the device 18), or the like.

In the embodiment in FIG. 2, the interface device 10 also includes a DC power input jack 32 connected to a DC power source. In such embodiments, the interface device 10 may connect to an external DC power source 42, to receive DC power for powering the interface device 10, itself and/or for passing through DC power to the DC power output jack 28 (or, alternatively, to another DC power output jack, not shown). In other embodiments, the DC power input jack 32 is omitted from the interface device 10.

In the embodiment in FIG. 2, the interface device 10 includes one or more manual controllers 34, such as, but not limited to, buttons, knobs, slide switches, toggle switches, or other suitable operators, for adjustably controlling an electronic parameter. In the embodiment in FIG. 2, the controller 34 comprises an operator for adjusting a microphone output gain for an external device 18 connected to the interface device 10.

In the embodiment in FIG. 2, the interface device includes one or more indicators 36, such as, but not limited to, an LED, LCD, incandescent bulb, or other visual indicator, sound generating device or other audible indicator, or the like. In the embodiment in FIG. 2, the indicator 36 comprises an LED that indicates the power ON or OFF status of the interface device 10. For example, the indicator LED is powered on, to indicate that the interface device 10 is connected to a PSE and is receiving a power signal from that connection.

The number and configuration of jacks, manual controllers and indicators in FIG. 2 is based on an example embodiment of the present invention. Other embodiments of the present invention employ other suitable numbers and configurations of jacks, controllers and indicators. For example, while the embodiment in FIG. 2 includes audio input and output jacks 24 and 26, for connection with audio output and input terminals of the external devices 18, other embodiments may employ video input and output jacks for connection with video output and input terminals of external devices. In yet other embodiments, jacks for other types of data (such as, but not limited to, alarm data, or the like) are included in the interface device 10, for connection to corresponding terminals on external devices.

Interface systems according to embodiments of the present invention include an interface device 10 and one or more (or all) of the PSE 12, device(s) 18, power source 42 and electrical connections between those components, for example, as shown in FIG. 2. Further embodiments of interface systems include more than one interface device 10 connected to one or more PSEs 12, device(s) 18, power source(s) 42 and electrical connections.

Figure 3:
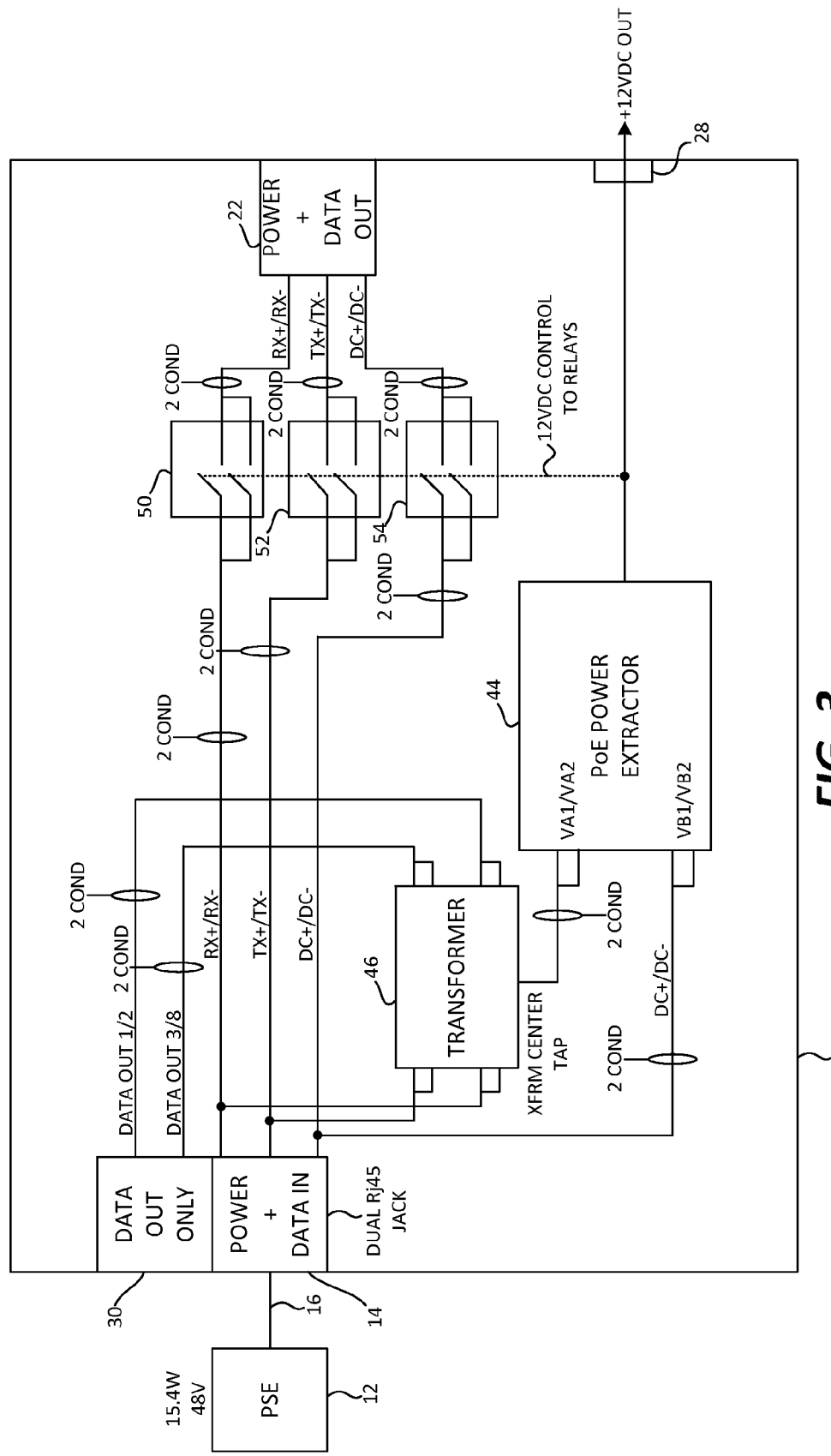
FIG. 3 is a schematic diagram of an example of electronics in an interface device according to an embodiment of the present invention.

The drawing in FIG. 3 shows a diagram of electronics in the interface device 10 for extracting power from the PSE 12, according to an embodiment of the present invention. In FIG. 3, the interface device 10 is connected to the PSE 12 (through the jack 14 and cable 16 as described above). The diagram in FIG. 3 also shows the power and data output jack 22, the DC power output jack 28 and the data output jack 30, described above.

In particular embodiments, the jacks 14 and 30, together, comprise a dual RJ-45 jack. In other embodiments, each of the jacks 14 and 30 in FIG. 3 may be any suitable electronic connector as described above. In particular embodiments, the jacks 22 and 28 comprise jacks, respectively. In other embodiments, each of the jacks 22 and 28 in FIG. 3 may be any suitable electronic connector as described above.

The interface device 10 extracts power through the single Ethernet-connected jack 14, from the PSE 12 and provides a power and data pass through (via jack 22) to a PD, as well as a power connection (via jack 28) and a data connection (via jack 30) to one or more non-PoE network devices.

The interface device 10 extracts power from the PSE connection (on spare pairs (DC) and data pairs (RX) and (TX)), and provides discrete power and data connections (via jacks 28 and 30) respectively) to non-PoE network devices. In the embodiment of FIG. 3, the interface device 10 includes an extractor circuit 44 that provides a valid PoE signature, so as to allow the PSE to provide power to the interface device 10.

The extractor circuit 44 is connected to extract power from the (DC) pairs from the jack 14. The extractor circuit 44 is also connected, through a center tapped transformer 46, to detect and extract power on the (RX) and (TX) pairs from the jack 14.

That is, when the interface device 10 is connected to a PSE 12, the extractor circuit 44 provides a valid PD signature (for example, a signature in accordance with a predefined standard associated with the PSE, such as, but not limited to the IEEE 802.3af standard). As a result of the signature recognition process, the PSE 12 provides power to the interface device 10.

In particular embodiments, the extractor circuit 44 is a PoE module or other suitable electronic circuit configured to extract power from a conventional Ethernet cable and, in particular embodiments, configured for signature recognition interfacing with the PSE 12, in compliance with IEEE 802.3af standard. Examples of an extractor circuit 44 include, but are not limited to, Ag9000 series PoE modules (and, in particular embodiments, include, but are not limited to, an AG9120 module) made by Silvertel Telecom Ltd. In other embodiments, the extractor circuit 44 may be any other suitable extractor circuit or other circuit configured to operate in the manner described herein.

The (DC), (RX) and (TX) lines from jack 14 are connected to one side of the respective relays 50, 52 and 54. The other side of each of the relays 50, 52 and 54 is connected to a respective (DC), (RX) and (TX) line of jack 22 (for connecting to a PD). The relays 50, 52 and 54, each have a control line connected to the output of the extractor circuit 44.

Because their control lines are connected to the output of the extractor circuit 44, the relays 50, 52 and 54 close and couple the (DC), (RX) and (TX) lines from the jack 14 to respective (DC), (RX) and (TX) lines of jack 22, when the extractor circuit 44 provides a DC output signal (as a result of the PSE 12 providing power and data communications on the (DC), (RX) and (TX) lines).

However, due to inherent delays in the relay circuits, the relays 50, 52 and 54 close after a predefined delay from the time at which the extractor circuit 44 provides a DC output signal (and, thus, from the time the PSE 12 provides power and data on the (DC), (RX) and (TX) lines). This delay allows the extractor circuit 44 and PSE 12 to complete the above-noted signature recognition process.

By providing a power and data lines (DC), (RX) and (TX) through the respective relays 50, 52 and 54 (from the jack 14 to the jack 22), a PD may be connected to the jack 22 and receive power, automatically (without requiring a manual mode selector (knob, etc.) on the interface device 10). A mode A PoE device receives power via the (RX) and (TX) lines (through relays 50 and 52), while a mode B PoE device receives power via the (DC) line (through relay 54). As the control line for each of the relays 50, 52 and 54 is connected to the output of the extractor circuit 44, power for a mode A or a mode B device is provided to the jack 22, when the extractor circuit 44 provides an output signal (i.e., when power is drawn on the (DC) line or transformer 46 input to the extractor circuit 44).

In the above embodiments, the relays 50, 52 and 54 provide an inherent delay, in providing the electrical connection between the jack 14 and the jack 22. In other embodiments, other types of delay elements or systems may be used to delay the electrical connection between jacks 14 and 22, to allow the signature recognition process to be sufficiently completed before the electrical connection is made. Other types of delay elements may include, but are not limited to, other types of electronic delay circuits, relays, switches, amplifiers, or the like, configured to selectively connect conductors from the jack 14 to corresponding conductors of the jack 22 (to allow signals to pass through the interface device 10, from the jack 14 to the jack 22), after a predefined delay period after a signal is output from the extractor circuit 44. In yet other embodiments, a delay configuration involves a manual switch and signal arrangement, that allows a user to receive a signal and, in response, manually connect (or manually operate a switch to connect) the jack 14 to the jack 22.

Accordingly, embodiments of the interface device 10 are configured to extract power from a single Ethernet port (connected at jack 14), and provide connections for: (i) power plus data input from a PSE (jack 14), (ii) data out for network devices not powered via PoE (jack 30), (iii) power plus data output for PD (jack 22), and (iv) power out for non-PoE devices (jack 28).

An interface device 10 according to an example embodiment of the present invention is shown and described as the IF-PX PoE Interface/Power Extractor in the installation and operating instructions attached hereto as Appendix 1, which is incorporated herein by reference in its entirety.

What is claimed is:

1. An interface device for interfacing one or more external devices to Ethernet Power Source Equipment PSE, the interface device comprising:
   a network connection jack for connection to the PSE;
   a first output jack for providing an Ethernet power and data connection for an external device;
   a second output jack for providing a DC power connection for an external device;
   a power extractor circuit operatively connected to the network connection jack, for providing a signature to the PSE and receiving a power signal from the PSE, the power extractor circuit providing a predefined output signal in response to receiving a power signal from the PSE, wherein the power extractor circuit has an output connected to the second output jack, to provide the predefined output signal to the second output jack, the predefined output signal for powering an external device when the external device is connected to the second output jack; and
   at least one delay element having a control input connected to the output of the power extractor and arranged to electrically connect the network connection jack and the first output jack, after a predefined delay from a time at which the power extractor circuit provides the predefined output signal at the output of the power extractor circuit.

2. An interface device as recited in claim 1, wherein the at least one delay element comprises at least one electronic relay having an input connected to the network connection jack, and an output connected to the first output jack.

3. An interface device as recited in claim 1, wherein the at least one delay element comprises a plurality of electronic relays, each having an input connected to the network connection jack, an output connected to the first output jack and a control input connected to an output of the power extractor circuit.

4. An interface device as recited in claim 1, wherein the network connection jack comprises a plurality of conductors including at least first, second and third pairs of conductors, and wherein the at least one delay element comprises a first electronic relay having an input connected to the first pair of conductors, a second electronic relay having an input connected to the second pair of conductors and a third relay having an input connected to the third pair of conductors.

5. An interface device as recited in claim 1, wherein the network connection jack comprises a plurality of conductors and wherein the extractor circuit is electrically connected with at least one of the plurality of conductors, through a center tap of a transformer.

6. An interface device as recited in claim 5, wherein the extractor circuit is electrically connected with at least another one of the plurality of conductors, through an electrical connection external to the transformer.

7. An interface device as recited in claim 1, wherein the network connection jack comprises a plurality of conductors, including power conductors and data/power conductors and wherein the extractor circuit is electrically connected with at least one of the power conductors.

8. An interface device as recited in claim 1, wherein the at least one delay element comprises at least one relay and wherein the control input comprises a control input that operates the relay to close an electrical connection between the network connection jack and the first output jack, in response to the predefined output signal being present at the output of the power extractor circuit.

9. An interface device as recited in claim 1, wherein the at least one delay element is configured to start the predefined delay while the power extractor circuit provides the predefined output signal to the second output jack.

10. An interface device as recited in claim 1, wherein the power extractor circuit provides the predefined output signal upon the power signal from the PSE being applied to the network connection jack, and wherein the at least one delay element is configured to start the predefined delay in response to the predefined output signal on the output of the power extractor and while the predefined output signal is provided to the second output jack.

11. An inter system comprising:
   at least one operational device;
   an interface device for interfacing the at least one operational device to Ethernet Power Source Equipment PSE, the interface device comprising:
      a network connection jack for connection to the PSE;
      a first output jack for providing an Ethernet power and data connection for an external device:
      a second output jack for providing a DC power connection for an external device;
      a power extractor circuit operatively connected to the network connection jack, for providing a signature to the PSE and receiving a power signal from the PSE, the power extractor circuit providing a predefined output signal in response to receiving a power signal from the PSE, wherein the power extractor circuit has an output connected to the second output jack, to provide the predefined output signal to the second output jack, the predefined output signal for powering an external device when the external device is connected to the second output jack; and
      at least one delay element having a control input connected to the output of the power extractor and arranged to electrically connect the network connection jack and the first output jack, after a predefined delay from a time at which the power extractor circuit provides the predefined output signal at the output of the power extractor circuit.

12. An interface system as recited in claim 11, wherein the at least one operational device comprises at least one of a microphone, a speaker, a camera, an encoder or a sensor.

13. An method for interfacing one or more external devices to Ethernet Power Source Equipment PSE, the method comprising:
   connecting a network connection jack to the PSE;
   providing a first output jack for Ethernet power and data to an external device;
   providing a second output jack for DC power to an external device;
   connecting a power extractor circuit to the network connection jack;
   configuring the power extractor circuit to provide a signature to the PSE and receive a power signal from the PSE, through the network connection jack;
   further configuring the power extractor circuit to provide a predefined output signal in response to receiving a power signal from the PSE;
   connecting the output of the power extractor circuit to the second output jack, to provide the predefined output signal to the second output jack, the predefined output signal for powering an external device when the external device is connected to the second output jack; and
   providing at least one delay element having a control input connected to the output of the power extractor, the at least one delay element electrically connecting the network connection jack to the first output jack, after a predefined delay from a time at which the power extractor circuit provides the predefined output signal at the output of the power extractor circuit.

14. A method as recited in claim 13, wherein the at least one delay element has an input connected to the network connection jack, and an output connected to the first output jack.

15. A method as recited in claim 14, wherein the at least one delay element comprises a plurality of electronic relays, each having an input connected to the network connection jack, an output connected to the first output jack and a control input connected to an output of the power extractor circuit.

16. A method as recited in claim 14, wherein the network connection jack comprises a plurality of conductors including at least first, second and third pairs of conductors, and wherein the at least one delay element comprises a first electronic relay having an input connected to the first pair of conductors, a second electronic relay having an input connected to the second pair of conductors, and a third relay having an input connected to the third pair of conductors.

17. A method as recited in claim 13, where the network connection jack comprises a plurality of conductors and wherein the method further comprises connecting the extractor circuit with at least one of the plurality of conductors, through a center tap of a transformer.

18. A method as recited in claim 17, further comprising connecting the extractor circuit with at least another one of the plurality of conductors, through an electrical connection external to the transformer.

19. A method as recited in claim 13, wherein the network connection jack comprises a plurality of conductors, including power conductors and data/power conductors and wherein the extractor circuit is electrically connected with at least one of the power conductors.

20. A method as recited in claim 13, wherein the predefined output signal comprises a predefined output voltage signal provided in response to receiving a power signal from the PSE, and wherein the method further comprises connecting an external device to the second output jack and connecting an output of the power extractor circuit to the second output jack, to provide the predefined output voltage signal to the external device.

21. A method as recited in claim 20, wherein the at least one external device comprises at least one of a microphone, a speaker, a camera, an encoder or a sensor.

* * * * *